(12) United States Patent
Reddy et al.

(10) Patent No.: US 7,336,183 B2
(45) Date of Patent: Feb. 26, 2008

(54) DECOMMISSIONING AN ELECTRONIC DATA TAG

(75) Inventors: Kiran K. Reddy, Roswell, GA (US); John Christian Onderko, Appleton, WI (US); Gary A. Clement, Menasha, WI (US); Fung-jou Chen, Appleton, WI (US); Jeffrey Dean Lindsay, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 11/273,409

(22) Filed: Nov. 14, 2005

(65) Prior Publication Data

US 2006/0087436 A1    Apr. 27, 2006

Related U.S. Application Data

(63) Continuation-in-part of application No. 10/835,862, filed on Apr. 30, 2004, now Pat. No. 7,098,794.

(51) Int. Cl.
*G08B 13/14* (2006.01)

(52) U.S. Cl. .................... 340/572.3; 169/61; 340/572.7

(58) Field of Classification Search ............ 340/572.1, 340/572.3, 572.7, 505, 10.1; 169/54, 56, 169/60, 61; 241/33; 235/492
See application file for complete search history.

(56) References Cited

U.S. PATENT DOCUMENTS

| | | | |
|---|---|---|---|
| 4,442,507 A | 4/1984 | Roesner | |
| 4,796,074 A | 1/1989 | Roesner | |
| 5,095,362 A | 3/1992 | Roesner | |
| 5,296,722 A | 3/1994 | Potash et al. | |
| 5,347,280 A | 9/1994 | Schuermann | |
| 5,360,941 A | 11/1994 | Roes | |
| 5,378,880 A | 1/1995 | Eberhardt | |
| 5,407,851 A | 4/1995 | Roesner | |
| 5,491,483 A | 2/1996 | D'Hont | |
| 5,521,601 A | 5/1996 | Kandlur et al. | |
| 5,528,222 A | 6/1996 | Moskowitz et al. | |
| 5,530,702 A * | 6/1996 | Palmer et al. ............. | 340/10.2 |
| 5,541,604 A | 7/1996 | Meier | |
| 5,550,547 A | 8/1996 | Chan et al. | |

(Continued)

FOREIGN PATENT DOCUMENTS

DE          19530823 A1    2/1997

(Continued)

OTHER PUBLICATIONS

Ashton, Kevin, "Embedding the internet in Everyday Products", The X Internet: The Next Voyage available at http://www.forrester.com/Events/Speech/0,5179,309-783-aios.00.html, Nov. 2001, 2 pages, Forrester Research, Inc., USA.

(Continued)

*Primary Examiner*—Thomas Mullen
(74) *Attorney, Agent, or Firm*—Armstrong Teasdale LLP

(57) ABSTRACT

Rendering data stored within an electronic data tag unreadable. A receptacle receives an article with the data tag, detects the presence of the electronic data tag, and decommissions the electronic data tag. The receptacle further modifies a label on the article to remove data printed thereon.

24 Claims, 5 Drawing Sheets

U.S. PATENT DOCUMENTS

| | | | |
|---|---|---|---|
| 5,565,846 A | 10/1996 | Geiszler et al. | |
| 5,625,341 A | 4/1997 | Giles et al. | |
| 5,680,106 A | 10/1997 | Schrott et al. | |
| 5,682,143 A | 10/1997 | Brady et al. | |
| 5,798,694 A | 8/1998 | Reber et al. | |
| 5,822,714 A * | 10/1998 | Cato | 340/572.1 |
| 5,926,110 A * | 7/1999 | Downs et al. | 340/572.1 |
| 5,990,794 A | 11/1999 | Alicot et al. | |
| 6,069,564 A | 5/2000 | Hatano et al. | |
| 6,084,530 A | 7/2000 | Pidwerbetsky et al. | |
| 6,094,173 A | 7/2000 | Nylander et al. | |
| 6,121,544 A | 9/2000 | Petsinger | |
| 6,169,483 B1 | 1/2001 | Ghaffari et al. | |
| 6,176,425 B1 | 1/2001 | Harrison et al. | |
| 6,201,474 B1 * | 3/2001 | Brady et al. | 340/572.7 |
| 6,204,764 B1 | 3/2001 | Maloney | |
| 6,226,619 B1 | 5/2001 | Halperin et al. | |
| 6,294,997 B1 | 9/2001 | Paratore et al. | |
| 6,294,999 B1 | 9/2001 | Yarin et al. | |
| 6,340,932 B1 | 1/2002 | Rodgers et al. | |
| 6,342,830 B1 | 1/2002 | Want et al. | |
| 6,456,239 B1 | 9/2002 | Werb et al. | |
| 6,507,279 B2 | 1/2003 | Loof | |
| 6,600,418 B2 | 7/2003 | Francis et al. | |
| 6,661,335 B1 | 12/2003 | Seal | |
| 6,662,642 B2 | 12/2003 | Breed et al. | |
| 6,672,512 B2 | 1/2004 | Bridgelall | |
| 6,680,702 B2 | 1/2004 | Yde-Andersen et al. | |
| 6,693,538 B2 | 2/2004 | Maloney | |
| 6,696,954 B2 | 2/2004 | Chung | |
| 6,703,935 B1 | 3/2004 | Chung et al. | |
| 6,714,121 B1 | 3/2004 | Moore | |
| 6,759,959 B2 | 7/2004 | Wildman | |
| 6,809,645 B1 * | 10/2004 | Mason | 340/572.1 |
| 7,136,721 B2 * | 11/2006 | Sano et al. | 340/5.92 |
| 2001/0013830 A1 | 8/2001 | Garber et al. | |
| 2002/0067264 A1 | 6/2002 | Soehnlen | |
| 2002/0067267 A1 | 6/2002 | Kirkham | |
| 2002/0109636 A1 | 8/2002 | Johnson et al. | |
| 2002/0149468 A1 * | 10/2002 | Carrender et al. | 340/5.61 |
| 2002/0152605 A1 | 10/2002 | Debraal | |
| 2002/0161652 A1 | 10/2002 | Paullin et al. | |
| 2002/0188259 A1 | 12/2002 | Hickel et al. | |
| 2002/0196150 A1 | 12/2002 | Wildman | |
| 2003/0031819 A1 | 2/2003 | Adams et al. | |
| 2003/0090388 A1 | 5/2003 | Pomes | |
| 2003/0099158 A1 | 5/2003 | De la Huerga | |
| 2003/0111540 A1 | 6/2003 | Hartmann | |
| 2003/0116634 A1 | 6/2003 | Tanaka | |
| 2003/0122655 A1 | 7/2003 | Hum et al. | |
| 2003/0155415 A1 | 8/2003 | Markham et al. | |
| 2004/0001568 A1 | 1/2004 | Impson et al. | |
| 2004/0036595 A1 | 2/2004 | Kenny et al. | |
| 2004/0049428 A1 | 3/2004 | Soehnlen et al. | |
| 2004/0058453 A1 | 3/2004 | Free et al. | |
| 2004/0060976 A1 | 4/2004 | Blazey et al. | |
| 2004/0066296 A1 | 4/2004 | Atherton | |
| 2004/0129781 A1 | 7/2004 | Kreiner et al. | |
| 2004/0133484 A1 | 7/2004 | Kreiner et al. | |
| 2004/0195308 A1 | 10/2004 | Wagner et al. | |
| 2004/0195309 A1 | 10/2004 | Wagner et al. | |
| 2004/0199401 A1 | 10/2004 | Wagner et al. | |
| 2004/0199545 A1 | 10/2004 | Wagner et al. | |
| 2004/0223481 A1 | 11/2004 | Juels et al. | |
| 2004/0250004 A1 | 12/2004 | Wildman | |
| 2005/0029149 A1 * | 2/2005 | Leung et al. | 206/524.8 |
| 2005/0051624 A1 | 3/2005 | Kipp et al. | |
| 2005/0116021 A1 | 6/2005 | O'Dougherty et al. | |
| 2005/0162277 A1 | 7/2005 | Teplitxky et al. | |
| 2005/0242957 A1 | 11/2005 | Lindsay et al. | |
| 2006/0087407 A1 * | 4/2006 | Stewart et al. | 340/572.1 |

FOREIGN PATENT DOCUMENTS

| | | |
|---|---|---|
| EP | 0 478 092 B1 | 4/1992 |
| EP | 0 574 399 B1 | 12/1993 |
| EP | 0 598 624 B1 | 5/1994 |
| EP | 0 615 285 A2 | 9/1994 |
| EP | 0 494 114 B1 | 11/1996 |
| EP | 0 786 749 A1 | 7/1997 |
| EP | 0 585 132 B1 | 9/1998 |
| EP | 0 760 985 B1 | 8/2000 |
| EP | 1 225 585 A1 | 7/2002 |
| EP | 1 326 219 A2 | 7/2003 |
| EP | 1 339 032 A2 | 8/2003 |
| FR | 2392451 A | 12/1978 |
| WO | WO 95/29456 A1 | 11/1995 |
| WO | 9813801 A1 | 4/1998 |
| WO | 9813802 A1 | 4/1998 |
| WO | WO 99/05660 A1 | 2/1999 |
| WO | WO 01/69516 A2 | 9/2001 |
| WO | WO 01/69524 A2 | 9/2001 |
| WO | WO 01/69525 A1 | 9/2001 |
| WO | WO 01/80174 A1 | 10/2001 |
| WO | WO 02/21424 A2 | 3/2002 |
| WO | WO 02/077939 A1 | 10/2002 |
| WO | WO 02/086910 A2 | 10/2002 |
| WO | WO 02/096781 A1 | 12/2002 |
| WO | WO 03/044892 A1 | 5/2003 |
| WO | WO 03/061060 A2 | 7/2003 |
| WO | WO 2004/023391 A1 | 3/2004 |
| WO | WO 2004/074964 A2 | 9/2004 |
| WO | WO 2005/008578 A1 | 1/2005 |

OTHER PUBLICATIONS

Brock, David L., "Integrating the Electronic Product Code (EPC) and the Global Trade Item Number (GTIN)", White Paper available at www.autoidcenter.org/pdfs/MIT-WUTOID-WH-004.pdf, Nov. 1, 2001, 25 pages, MIT AUTO-ID Center, Massachusetts Institute of Technology, Cambridge, MA, USA.

"Combating Counterfeit Drugs: A Report of the Food and Drug Administration", Feb. 2004, http://www.fda.gov/oc/initiatives/counterfeit/report02_04.html, 37 pages, The United States Department of Health and Human Services, U.S. Food and Drug Administration, USA.

"FDA's Counterfeit Drug Task Force Interim Report" available at http://www.fda.gov/oc/initiatives/counterfeit/report/interim_report.html, Oct. 2003, 27 pages, The Untied States Department of Health and Human Services, U.S. Food and Drug Administration, USA.

Hannibal, "Opt-out Feature for RFID Tags", available at http://arstechnica.com/news/posts/1052194426.html, May 5, 2003, 3 pages, Ars Technica, LLC, USA.

"IST-2000-29551 SIDCOM", "Network on Sensing, Identification and Data Communications with Passive Non-Contact Technologies" available at www.fuse-network.com/sidcom/eurosid/demonstration/projects/fl_04.pdf, 4 pages, accessed Jun. 2004, PAV CARD GmbH, Institut für Angewandte Midroelektronik Forschungs-und Entwicklungs GmbH, Germany.

Losefsky, Pam, "It's Here—Alien Technology", The McCombs School of Business Magazine, 2001, 3 pages, University of Texas, USA.

"Mikoh Coporation Adopts Tag-It™ RFID Smart Label Inlays From Texas Instruments", available at http://www.ti.com/tiris/docs/news/news_releases/2000/rel07-13-00.shtml, Jul. 13, 2000, 4 pages, Texas Instruments Inc., USA.

"Pervasive Computing Goes the Last Hundred Feet . . . ", available at http://dsonline.computer.org/0306/d/b2app3.htm, accessed Jun. 10, 2004, 3 pages, Institute of Electrical and Electronics Engineers, Inc., USA.

"Protection of Personal Property Via Radio Frequence Identifiers", Apr. 28, 2004, published at IP.com as Document ID 000028146, 2 pages, USA.

"RFID May Reduce Electricity Theft", available at http://www.rfidjournal.com/article/articleview/56/1/1/, Aug. 20, 2002, 2 pages, RFID Journal, Inc., USA.

"RFID Medicine Tracking", available at http://www.yenra.com/rfid-medicine-tracking/, Jul. 18, 2003, 2 pages, Yenra, USA.

Sarma, Sanjay, "Towards the 5¢ Tag", Nov. 1, 2001, 19 pages, MIT AUTO-ID Center, Massachusetts Institute of Technology, Cambridge, MA, USA.

Schoenberger, Chana R., "The Internet of Things; Chips at the Checkout Counter", Forbes Magazine, Mar. 18, 2002, vol. 169, Issue 5, 3 pages, Forbes, USA.

Starkman, Dean, "International Paper and Motorola Agree to Put Microchips in 'Smart Packages'", Wall Street Journal, Apr. 13, 2000, 2 pages, The Wall Street Journal, USA.

Vanscoy, Kayte, "They Know What You Eat", Smart Business, 2001, 2 pages, Mindfully.org, USA.

"Variety and Versatility in a Coil . . and More", available at http://www.rcdtechnology.com/application.html, 2001-2002, 2 pages, RCD Technology, Inc., USA.

Witt, Clyde E., "Packaging Meets RFID—Finally", Material Handling Management, Abstract, Jun. 2000, 3 pages, vol. 55, Issue 6, USA.

Finkenzeller, Klaus, RFID Handbook: Fundamentals and Applications in Contactless Smart Cards and Identification, Second Edition, 2003, 40 pages, Wiley and Sons, Inc., USA.

RFIDwasher, printed from http://rfidwasher.com, 2004, 1 page, Orthic Limited, United Kingdom.

Ehisen, "Prying Eyes," State Net Capitol Journal, Jul. 4, 2005, vol. XIII, No. 23, 15 pages, State Net, USA.

Unknown, "RFID Tag Privacy Concerns," Watching Them, Watching Us, Spy Blog, http://www.spy.org.uk/cgi-bin/rfid.pl, 23 pages, USA, date unknown.

* cited by examiner

DECOMMISSIONING AN ELECTRONIC DATA TAG

CROSS-REFERENCE TO RELATED APPLICATIONS

This application is a continuation-in-part of U.S. patent application Ser. No. 10/835,862, now U.S. Pat. No. 7,098,794, filed Apr. 30, 2004, entitled "DEACTIVATING A DATA TAG FOR USER PRIVACY OR TAMPER-EVIDENT PACKAGING," hereby incorporated by reference.

BACKGROUND

Many manufacturers apply radio frequency identification (RFID) tags to packaged materials and products to trace the flow of the materials and products through the manufacturing and supply chain. Each of the RFID tags stores an electronic product code (EPC) and/or other information related to the material or product. There is concern that any individual with a transmitter, not just the manufacturer, may be able to activate and detect a dormant RFID tag and track the flow of the material or product through the manufacturing and supply chain and on the retail shelves. After being discarded into the trash by the consumer, the RFID tag may be used to track consumer behavior. The consumer's trash then inadvertently becomes a source of market research data. To prevent such use of the RFID tag, the RFID tag must be decommissioned or otherwise deactivated or destroyed (e.g., after purchase of the product by the consumer). Further, the EPC should be destroyed after use to prevent counterfeit operations from reusing legitimate EPCs on counterfeit products.

Some previous systems dispose of waste by incineration. Other systems detect and quantify various kinds of waste such as those generated in a health care facility. Still other systems keep track of disposed items and suggest an order for replacing the disposed items. Still other systems sort trash in a recycling facility. While some prior systems block the radio frequency signal emitted from an RFID tag, none of the prior systems decommissions the RFID tag to protect user privacy.

Further, some articles include both an RFID tag containing a unique EPC as well as a printed label displaying the EPC. Some systems remove the printed EPC labels, but there is a risk of "dumpster diving" by counterfeiters to obtain these removed EPC labels. A discarded article that has both a printed EPC and an RFID tag storing the EPC has an increased chance of having the EPC obtained by a counterfeiter. While the printed label may be marked with a black marker to obscure the EPC and the RFID tag may be deactivated with electromagnetic energy or by broadcasting a terminating code to deactivate suitably designed chips, there is a risk that both decommissioning acts will not be performed by the consumer.

SUMMARY

Embodiments of the invention include a device for detecting and decommissioning, inactivating, neutralizing, and/or destroying the ability to read an electronic product code (EPC) stored in a radio frequency identification (RFID) tag on an article. In one embodiment, the invention further decommissions a printed label on the article having the EPC displayed thereon.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
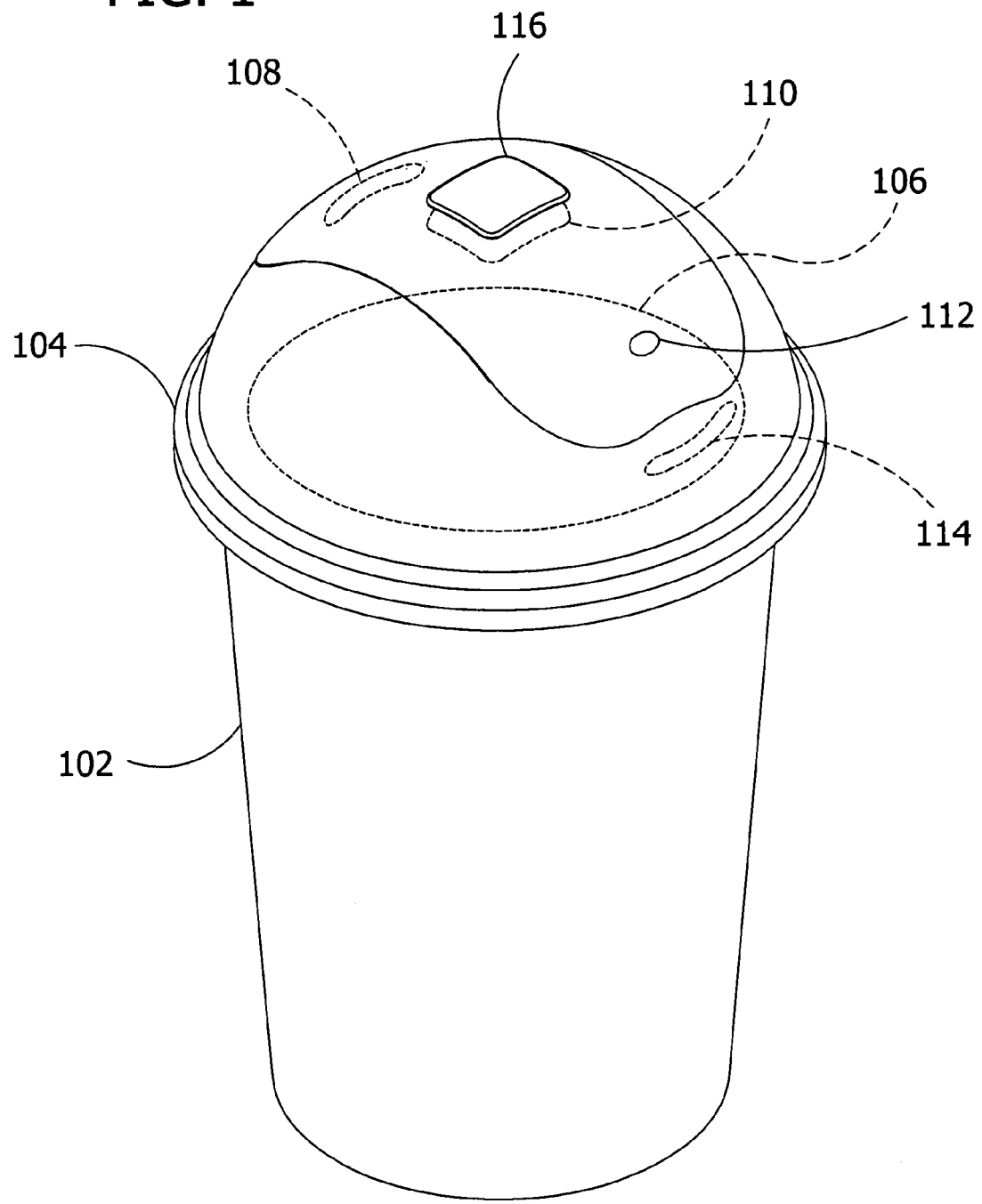
FIG. 1 is an exemplary embodiment of a trash receptacle for decommissioning an electronic identification tag on an article placed in the trash receptacle.

In an embodiment, the invention includes a receptacle that decommissions electronic data tags on articles placed in the receptacle. In particular, embodiments of the invention includes a compartment for receiving a plurality of articles each having an electronic data tag associated therewith, a decommissioning device for decommissioning the received electronic data tags, and means for selectively activating the decommission device such as shown in FIG. 1. In FIG. 1, a trash receptacle 102 has a modular lid assembly 104. In one embodiment, the modular lid assembly 104 includes a secondary lid 106 that creates a chamber in the modular lid assembly 104 for containing the article for decommissioning via pulsated (e.g., rhythmically energizing the data tag), controlled (e.g., via user input), and site-specific (e.g., focused decommissioning energy) decommissioning. The modular lid assembly 104 and the secondary lid 106 act as a double door mechanism (e.g., similar to an air lock) to prevent exposure of the decommissioning energy to the user.

A detection device (e.g., an electronic data tag detector) 108 in the modular lid assembly 104 detects receipt of an article having an electronic data tag affixed thereon or on article packaging. A decommission device 110 in the modular lid assembly 104 decommissions or deactivates the article. In one embodiment, a motion sensor 112 (e.g., in the modular lid assembly 104) detects input of the article by the user into the receptacle 102, thus triggering the detection device 108 to determine if the input article has a data tag thereon. If the detection device 108 determines that the input article has a data tag, a dose of decommissioning energy (e.g., laser, heat, microwave, or ultrasonic) is delivered to the article to decommission the tag. Alternatively or in addition, a timer device 114 regularly activates the decommission device 110 as a function of time. The elements of the trash receptacle 102 may be powered via a wall outlet or a power source 116 (e.g., batteries, a fuel cell, or a solar panel). In one embodiment, decommissioning occurs with destroying the plurality of articles (e.g., by incineration). In another embodiment, articles are temporarily held in the receptacle to be decommissioned before being released to the public, sent to a waste facility, or otherwise dispersed or relocated.

In another example, the detection device includes means for detecting a frequency range of the electronic data tag. The electronic data tag may be decommissioned as a function of this detected frequency range. For example, if the detected frequency range falls within a predetermined or predefined frequency range, then the electronic data tag is decommissioned. If the detected frequency range is not within a predetermined or predefined frequency range, then the electronic data tag is not decommissioned.

The receptacle 102 itself may comprise RF shielding such as a metallic wire, metallic walls, etc., to serve as a Faraday cage or otherwise to limit the ability of external RFID readers to obtain information from RFID chips inside the receptacle prior to decommissioning or in the event that decommissioning fails.

In one embodiment, the system comprises means for identifying the type of data tag present, and means for selecting a subsequent action responsive to the identified data tag type. The means for identifying and the means for selecting include, but are not limited to, any of the following examples. In one example, a multi-protocol RFID reader such as detection device 108 may be employed to identify the intended frequency of the RFID data tag, and to determine if the data tag is passive or active, based on received signals and/or signal strength. The tag may also be queried to further determine its nature. The system may then be programmed, either at the factory level or by the user, to specify subsequent actions as a function of the tag type. For example, the decommission device 110 constitutes means for selecting the action and may be programmed to decommission all EPC Generation 2 RFID tags, take no action against passive low-frequency tags, and issue an audible alert if an active RFID tag is identified. Alternatively, certain ranges of electronic product codes may trigger an alert or other special actions, such as sending an audible alarm if the electronic product code appears to belong to a relatively expensive electronic device such as a digital camera or PDA. For tags that are to be decommissioned, the energy applied and the frequency or duration of the energy may also be responsive to identified tag information and user settings. In one embodiment, a user interface provides a means for the user to specify rules for the decommissioning of tags. For example, a handheld PDA may interact with the device to provide a menu-driven interface allowing the user to specify what steps to take for certain tag types. Thus, user-specified settings can be obtained that may override factory-specified defaults. In such an embodiment, the means for selecting the action operates based on a set of the decommissioning rules. The system further includes means for performing the selected action. Any of the examples described herein constitute examples of the means for performing the selected action.

Data tag technology such as radio frequency identification (RFID) technology refers to passive or active smart tags (miniature antenna-containing tags requiring no internal power supply) that may be embedded in or attached to a product or material to convey information that may be read by a scanner. Generally, smart tags include a data circuit and an antenna. In particular, smart tags include a semiconductor, a coiled, etched, or stamped antenna, a capacitor, and a substrate on which the components are mounted or embedded. A protective covering is typically used to encapsulate and seal the smart tags.

In general, RFID systems and other data tag systems include readers and tags in which the tags generate an electromagnetic response to an electronic signal from a reader. The response signal is read by the reader, typically with a readable range on the order of a few feet, though broader or narrower ranges are possible. The signal generated by the tag includes information (e.g., an electronic product code) that identifies the tag or the article comprising the tag.

Such a data tag, smart tag, or other identification means (e.g., a bar code) may be placed by hand or by machinery on an article. The data tag may be placed inside or outside of the article or on associated packaging. The data tag stores identification information or other information. In one embodiment, the information in the tag is used to assist in routing of the article in the manufacturing process. The data tag reader interrogates a data tag affixed to or otherwise associated with an article. The invention is operable with any form of data tag including, but not limited to, active and passive radio frequency identification (RFID) tags or other smart tags.

In general, RFID chips may be read-only chips, which include a fixed electronic code, or they may be read-write chips, which allow new information to be added. The chips may also be associated with sensors to read sensor information and transmit a signal responsive to the information, such as a value from a biosensor. Exemplary smart tags including RFID technology associated with a sensor are the active labels of KSW Microtec (Dresden, Germany), including TEMPSENS® active smart labels for measuring and recording temperature.

RFID tags can take many physical formats, such as a microchip from 30 to 100 microns thick and from 0.1 to 1 mm across, joined to a minute metal antenna such as the Hitachi 2.45 GHz Mew chip. Another form is the "Coil-on-Chip" system from Maxell (Tokyo, Japan). Exemplary RFID vendors of tags and/or readers and associated systems include Alien Technologies (Morgan Hill, Calif.), Intermec Technologies Corporation (Everett, Wash.), Symbol Technologies (Holtsville, N.Y.), AWID (Monsey, N.Y.), Philips Semiconductor (Eindhoven, The Netherlands), and Texas Instruments (Dallas, Tex.).

RFID smart tag technology is known and understood by those skilled in the art, and a detailed explanation thereof is not necessary for purposes of describing embodiments of the method and system according to the present invention. RFID systems for improved manufacturing have been proposed for systems including the PIPE/STORM systems disclosed in commonly owned U.S. Pat. No. 7,032,816, "Communication Between Machines and Feed-Forward Control in Event-Based Product Manufacturing," filed Nov. 27, 2002 by Markham et al., which is herein incorporated by reference.

Figure 2:
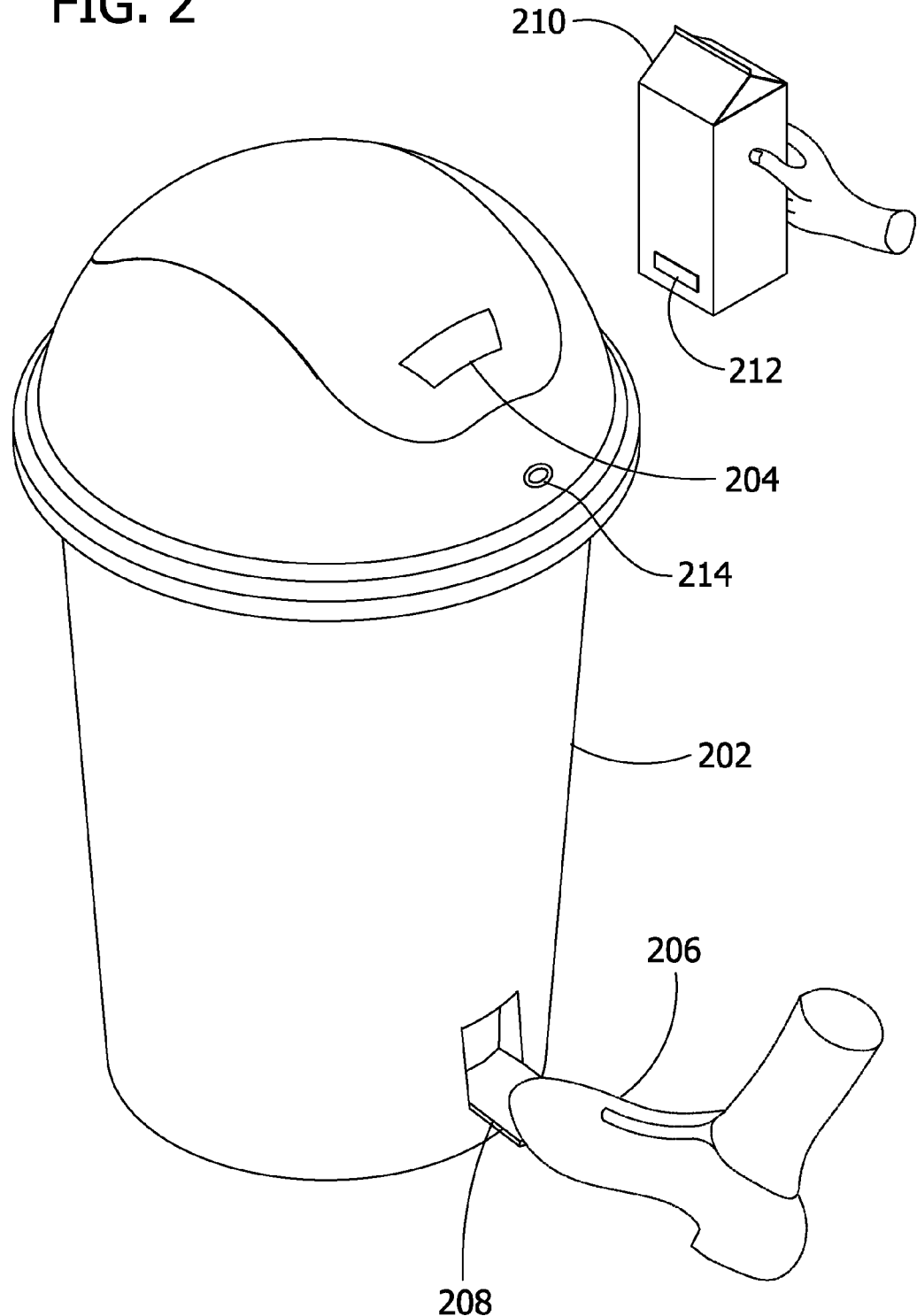
FIG. 2 is an exemplary embodiment of a trash receptacle for decommissioning an electronic identification tag on an article in response to a user pressing a pedal of the receptacle.

In embodiment, the elements illustrated in FIG. 1 were molded into a modular unit (e.g., a lid with a compartment) to fit traditional trash cans of various lid sizes. In other embodiments, the elements of embodiments of the invention are placed throughout the receptacle. For example, referring next to FIG. 2, a trash receptacle 202 has a decommission contact surface 204 which is activated by the user 206 pressing a pedal 208 of the receptacle 202 as the article 210 is placed inside the receptacle 202. The article 210 has an electronic data tag 212, and the decommission contact surface 204 decommissions the tag as the article is placed inside the receptacle 202. In another embodiment, the user presses a button 214 to activate the decommission contact surface 204.

Figure 3:
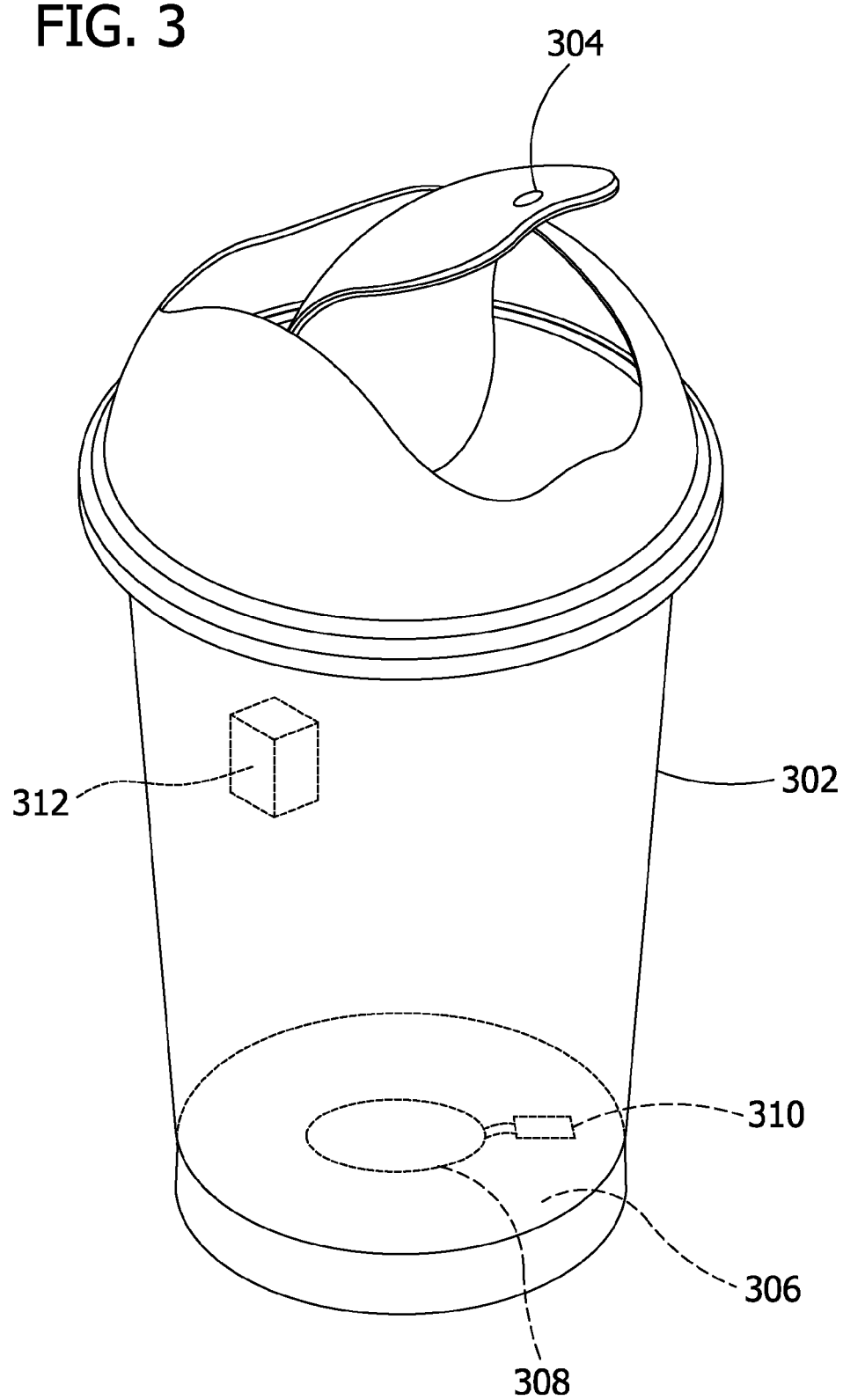
FIG. 3 is an exemplary embodiment of a trash receptacle having a lid with a motion sensor therein and a base with a decommission device for decommissioning an article detected by the motion sensor.

Referring next to FIG. 3, a receptacle 302 includes a base having a decommission device 308 incorporated therein. A motion sensor 304 detects entry of an article into the receptacle 302. (Alternatively, other sensors such as MEMS accelerometers on a movable section or switches or other devices responsive to the act of opening may be employed to detect input.) The motion sensor 304 alerts the detection element 306 to energize and determine if the article has an electronic data tag thereon. If the article is determined by the detection element 306 to have an electronic data tag, a decommission device 308 energizes to decommission the electronic data tag. Alternatively or in addition, the receptacle 302 includes a timer device 310 for regularly activating the decommission device 308 to decommission any articles that have been placed inside the receptacle 302. In one embodiment, the timer device 310 is part of the detection element 306. The timer device 310 may activate the decommission device 308 at regular intervals (e.g., every night or every time the lid of the receptacle 302 is opened).

In one embodiment, the detection element 306 or a signaling mechanism indicates to the user that the article contained an electronic data tag and that the tag was or was not successfully decommissioned. For example, lights and sounds may be employed to communicate with the user such as a red or green light or light emitting diode (LED), an alarm sound, or a recorded voice to confirm to the user about the status of the electronic data tag in the article.

Figure 4:
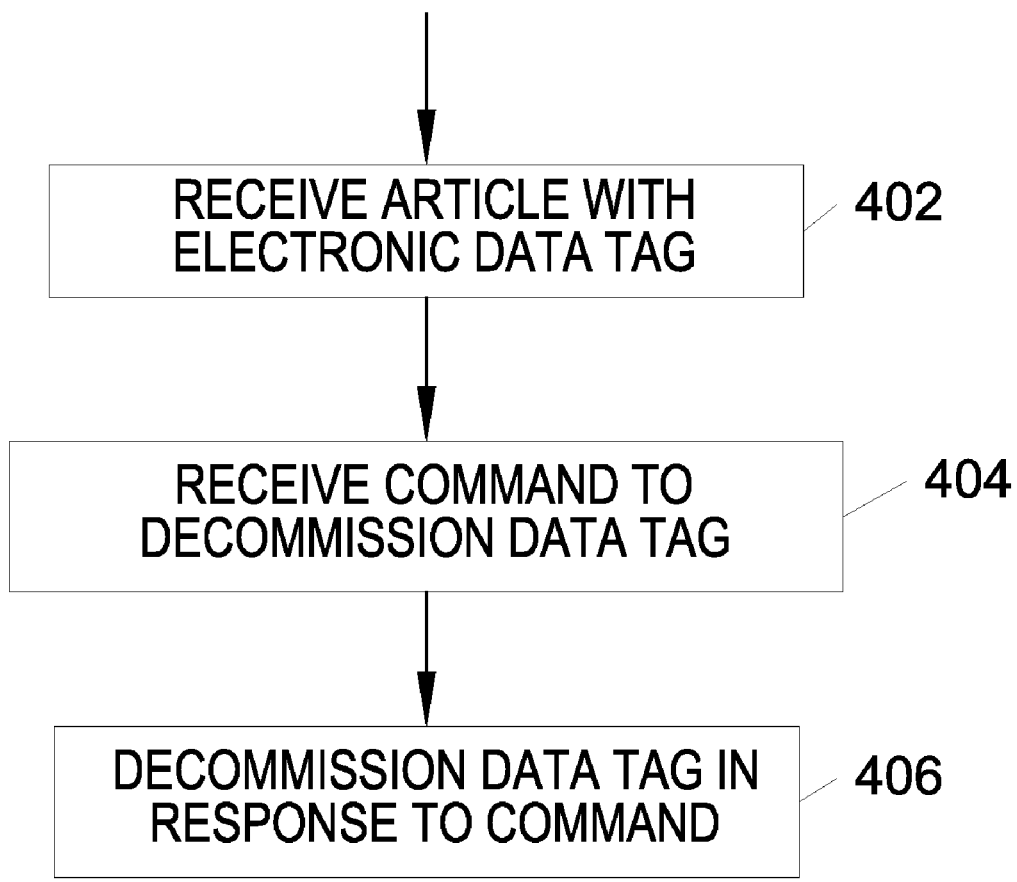
FIG. 4 is a flow chart illustrating exemplary operation of embodiments of the invention.

Referring next to FIG. 4, a flow chart illustrates decommissioning. At 402, the receptacle receives, from a user, an article having an electronic data tag storing data. At 404, an interface of the receptacle receives a command to decommission the electronic data tag on the received article. For example, the command may come from the user or a timer device. The decommission device decommissions the electronic data tag at 406 in response to the received command to render inaccessible the data stored within the electronic data tag. Decommissioning includes disabling a passive data tag and/or an active data tag permanently or temporarily. In one embodiment, a device may be able to re-commission or re-activate the data tag such that data stored within the data tag is accessible and/or readable by the user.

Decommission devices may include, but are not limited to, one or more of the following: a miniature microwave generator (e.g., a magnetron) to completely destroy the chip within the electronic data tag and render it useless for further use or retrieving data, a targeted laser system to disconnect the antenna from the chip, a simple heating pad (e.g., irradiative, conductive or convective) to physically destroy the chip, a site specific and selective chemical spray with metal corroding actives (e.g., acids) to corrode the chip, an ultrasonic generator that comes into physical contact with the chip and destroys the chip, a radio frequency controlled device (e.g., a transceiver) to detect any information on the chip and scramble the embedded information in the chip and render it useless, and a scratching/shredding type roll device (e.g., a hammer) which physically mutilates at least a portion of the chip (e.g., the surface) to disrupt the connection between the antenna and chip. Further, decommission devices may combine ultrasonic or other physical disruption means with an optical head of a bar code scanner to decommission the data tag. In other embodiments, decommissioning may occur without coming into physical contact with the data tag.

Alternatively or in addition, a change in environmental conditions or exposure to a deliberate triggering event (e.g., upon purchasing or discarding the product or article) may result in a chemical reaction that destroys a conductive portion of an electronic data tag circuit such that the trigger event results in disconnection of the chip from the antenna in the tag. Alternatively, the trigger event could initiate a chemical reaction that converts a non-conductive reagent into a conductive material to form a conductive pathway that short-circuits the antenna and disables the tag. Reactions may be triggered by application of ultraviolet light, by applying pressure to release one or more reagents formerly separated by means of a frangible seal (e.g., a small blister-pack type unit such as those made by Klocke AG or others, wherein a reagent may be released by applying physical pressure to a fluid-filled pouch). The receptacle illustrated in the figures may embody such embodiments.

In another embodiment, the decommission device may generate ultrasonic excitation to decommission a tag that is embedded in laminate or plastic which makes it difficult to access leads for alteration of conductivity. In this embodiment, the tags would include chip (or strap)-to-antenna adhesive that responds to the ultrasonic excitation by dissolving or breaking part of the antenna's circuit. Similarly, a portion of the antenna may comprise conductive particles in a base that may be disrupted by application of ultrasonic energy, heat, intense light, ultraviolet radiation, or by other physical or chemical means of the decommission device. For example, an induction coil may be present to induct a strong electromagnetic field to destroy data tags. Microwave generators may also be used. In another embodiment, the decommission device alters the temperature conditions such that temperature-activated adhesive in the tag disintegrates and disables the connection between the antenna and the chip in the tag.

In embodiments where intense electromagnetic energy is applied to a tag, it may be desirable in some cases to also incorporate fire suppression means (e.g., see fire suppression means 312 in FIG. 3) due to the possibility that some tag types may overheat when exposed to intense energy. Fire suppression means may include applying a blanket of an inert gas such as carbon dioxide or nitrogen prior to decommissioning, or providing other fire safety means such as extinguishing means, fire detection means, isolation means to seal a tag during decommissioning to prevent burning, and so forth. For example, the fire suppression means may include a carbon dioxide cartridge or other reservoir of fire-suppressing material responsive to a sensor for heat or smoke, such that the presence of high-temperatures during decommissioning of a tag would result in release of a suitable amount of the fire-suppressing material to reduce the risk of fire. Alternatively or in addition, the decommissioning process may be designed to prevent fire hazards.

Figure 5:
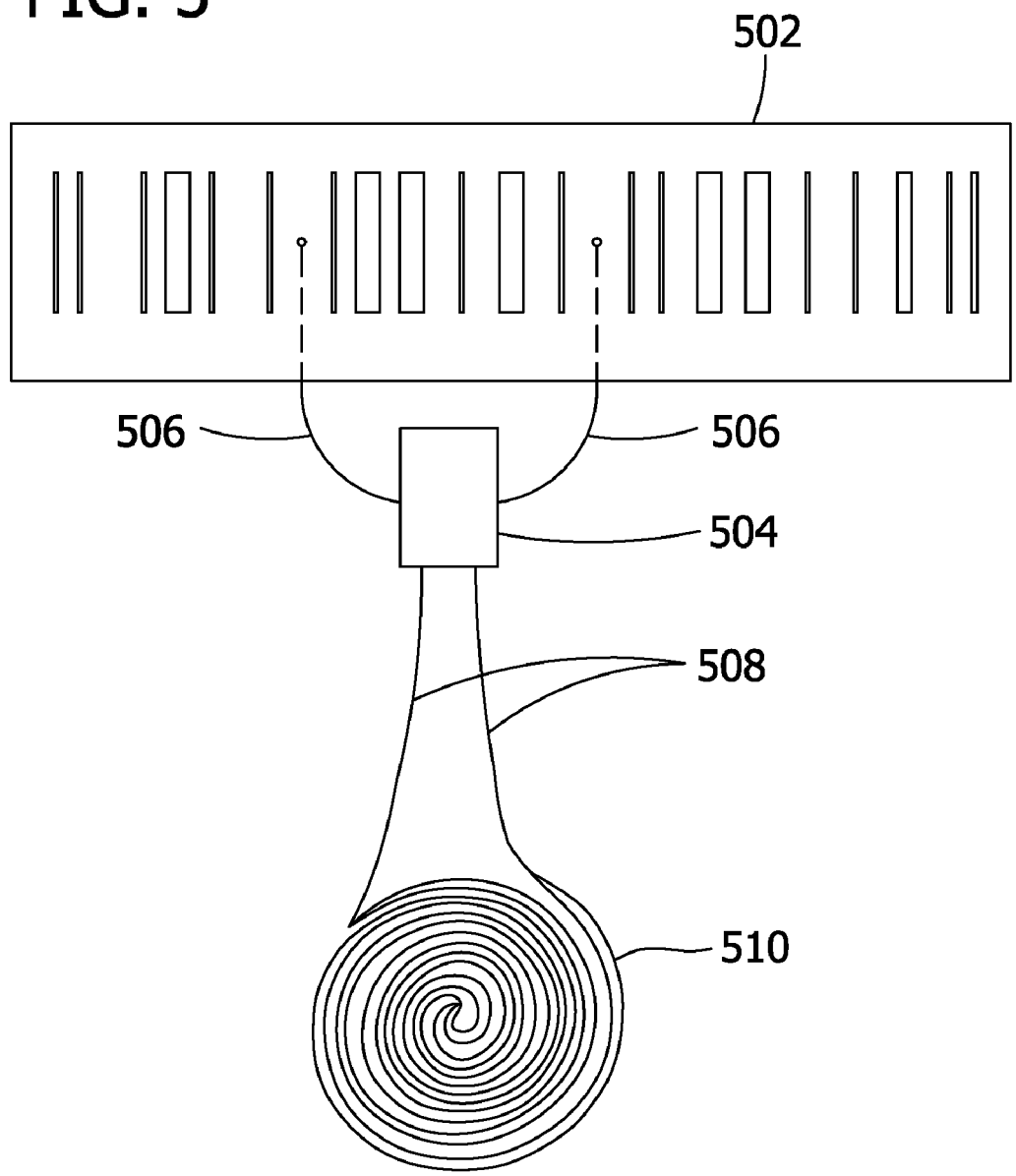
FIG. 5 is an exemplary embodiment of a printed bar code in combination with an electronic data tag.

Some articles may have a printed label 502 displaying data such as an electronic product code (EPC) along with an electronic data tag 504 such as shown in FIG. 5. In FIG. 5, the electronic data tag 504 is connected to the printed label 502 via exterior terminal leads 506. The electronic data tag 504 is connected to an antenna 510 via antenna leads 508.

The decommission device of embodiments of the invention modifies the printed label 502 to render the data unreadable and decommissions the data tag substantially simultaneously, or in a single step or operation. Substantially simultaneously includes, but is not limited to, performing the modifying and decommissioning functions within five seconds of each other, within thirty seconds of each other, and within five minutes of each other. While the label may be printed with materials that change over time or in response to a change in environmental conditions, such as exposure to sunlight, such that discarded printed labels soon become unreadable, a label may become unreadable in response to a temperature-activated chemical reaction (initiated by the decommission device) that destroys the legibility of the label by adjusting the ambient temperature significantly above or below the storage temperature of the article. This may also be integrated with expiration date labels to provide a visual indicator of product expiration (e.g., a drug in a pharmacy). The change in the label may be driven by enzymatic reactions known in the art coupled with temperature-sensitive color changes known in the art for time and temperature sensitive packaging.

In another embodiment, the decommission device may tear or peel off at least a portion of the printed label 502 to reduce the readability and/or effective range of the printed label 502 and electronic data tag 504. In yet another embodiment of the invention, means for decommissioning include packaging that automatically decommissions a data tag when the package becomes empty. In another embodiment, means for decommissioning includes means for applying radio frequency energy to the electronic data tag to decommission the electronic data tag. For example, when product mass drops to a certain level or the last product is removed, the data tag is decommissioned. Alternatively or in addition, the data tag may be connected to a cap of a bottle so that the data tag is decommissioned when the bottle is opened. Popping a seal, removing the cap, ripping the package, peeling off a perforated strip, and other physical disruption means destroys the connection to the antenna and decommissions the data tag in various embodiments of the invention. Related concepts have been discussed in co-pending U.S. patent application Ser. No. 10/835,862, filed Apr. 30, 2004, entitled "DEACTIVATING A DATA TAG FOR USER PRIVACY OR TAMPER-EVIDENT PACKAGING," previously incorporated by reference.

The decommission device may also operate to manually mar the printed label 502 and decommission an electronic data tag 504 via ink from a pen or marker that is adapted to also render an electronic circuit inactive. A circuit may be shorted by applying a conductive ink that joins two portions of an antenna circuit that have leads near or on the surface of the label such that the leads can be joined by application of conductive ink to the label. Alternatively or in addition, the applied ink may contain a solvent or chemical reagent that causes or triggers a reaction that destroys a portion of the tag's circuit beneath the label or a conductive portion near the surface of the label. For example, a conductive bridge comprises printed conductive ink applied with the printing of the label to activate the tag's circuit. In another embodiment, the pen or a pen holder also emits static electricity or radio frequency energy adapted to decommission the electronic data tag 504 by, for example, emitting a code that triggers deactivation of suitably programmed chips.

The following examples further illustrate embodiments of the invention. Hardware, software, firmware, computer-executable components, computer-executable instructions, and/or the elements of FIGS. 1-4 constitute means for receiving the article from a user, means for detecting the electronic data tag 504, means for selectively activating the decommission device, means for detecting a frequency range of the electronic data tag 504, means for decommissioning the electronic data tag 504 associated with the article (e.g., as a function of a detected frequency range of the electronic data tag 504), means for applying radio frequency energy to the electronic data tag 504 to decommission the electronic data tag 504, and means for modifying the label to render the EPC unreadable.

While some embodiments of the invention are described herein as being operable with radio frequency identification (RFID) systems, the invention is operable with any form of data tag. That is, the invention is not limited to RFID. It is to be understood that many other technologies are potential substitutes for the RFID embodiments disclosed herein. For example, RFID readers or detectors could be replaced with optical scanners, image analysis devices, arrays of chemical detection devices, and the like to allow other technologies for reading identification means to be applied.

A related technology within the scope of the present invention is Surface Acoustic Wave (SAW) technology. For example, InfoRay (Cambridge, Mass.) markets a passive smart tag that is said to achieve long ranges (up to 30 meters) using a Surface Acoustic Wave (SAW) device on a chip coupled with an antenna. The SAW device converts a radio signal to an acoustic wave, modulates it with an identification code, then transforms it to another radio signal that is emitted by the smart tag and read by a scanner. The identification code of the smart tag is extracted from the radio signal. RFSAW, Inc. (Dallas, Tex.) also provides minute Surface Acoustic Wave (SAW) RFID devices that may be used within the scope of the present invention.

Another related technology is ultra-wide band (UWB) technology. UWB technology permits wireless communication between objects using low-power electromagnetic transmissions. However, receivers and transmitters generally are both active but use very low power, typically less than that of radio frequency noise, relying on intermittent pulses that cover a broad band of frequencies rather than transmissions of a particular frequency. UWB technology may provide much higher spatial capacity (information transmission per unit area) than other wireless standards such as BLUETOOTH brand computer communication services or Institute of Electronics and Electrical Engineering (IEEE) 802.11a or 802.11b.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system comprising:
   a compartment for receiving a plurality of articles each having an electronic data tag associated therewith;
   a single decommission device for simultaneously decommissioning the received plurality of electronic data tags without instructing the electronic data tags to disable themselves; and
   means for selectively activating the decommission device.

2. The system of claim 1, wherein the decommission device decommissions each of the electronic data tags to render data stored within the electronic data tag unreadable without destroying the plurality of articles.

3. The system of claim 1, wherein each of the plurality of articles includes packaging, and wherein the decommission device decommissions the electronic data tag affixed to the packaging.

4. The system of claim 1, wherein the means for selectively activating the decommission device comprises an electronic data tag detector.

5. The system of claim 1, further comprising a receptacle having a lid, said lid being adapted to contain the means for selectively activating and the decommission device.

6. The system of claim 1, further comprising a receptacle having a base, said base containing an electronic data tag detector and the decommission device.

7. The system of claim 1, wherein the means for selectively activating the decommission device comprises one or more of the following: a timer device, a button, a pedal, and a motion sensor.

8. The system of claim 1, wherein the decommission device comprises one or more of the following: a miniature microwave generator, a targeted laser system, a heating pad, a chemical spray, an ultrasonic generator, a radio frequency controlled device, a scratching roll device, and a shredding roll device.

9. The system of claim 1, further comprising a timer device for decommissioning contents of the compartment at regular intervals.

10. The system of claim 1, further comprising a power source to provide power to the decommission device and the means for selectively activating the decommission device.

11. A method for decommissioning an electronic data tag on an article upon discarding the article, said method comprising:
receiving, from a user into a receptacle having a decommission device, a discarded article having an electronic data tag storing data capable of association with the user;
receiving a command to decommission the electronic data tag on the received, discarded article; and
decommissioning the electronic data tag in response to the received command to protect user privacy by rendering inaccessible the data stored within the electronic data tag and capable of association with the user.

12. The method of claim 11, wherein receiving the command comprises receiving input from the user stepping on a pedal of the receptacle or pressing a button on the receptacle.

13. The method of claim 11, wherein decommissioning the received electronic data tag comprises one or more of the following: disconnecting an antenna from the electronic data tag, physically destroying or corroding or mutilating at least a portion of the electronic data tag, and scrambling information stored within the electronic data tag.

14. A system for decommissioning an electronic data tag and a label having a readable electronic product code (EPC) printed thereon, said electronic data tag and said label being associated with an article, said system comprising:
means for receiving the article from a user;
means for decommissioning the electronic data tag associated with the article received by the means for receiving; and
means for modifying the label to render the EPC unreadable.

15. The system of claim 14, wherein the means for decommissioning the electronic data tag decommissions the electronic data tag in response to the means for receiving the electronic data tag receiving the electronic data tag, and wherein the means for modifying the label modifies the label in response to the means for receiving the electronic data tag receiving the electronic data tag.

16. The system of claim 14, further comprising data stored within the electronic data tag, and wherein the means for decommissioning renders the data inaccessible.

17. The system of claim 14, wherein the electronic data tag comprises a radio frequency identification (RFID) tag.

18. The system of claim 14, further comprising means for detecting the electronic data tag responsive to the means for receiving.

19. The system of claim 14, wherein the means for decommissioning and the means for modifying operate responsive to one or more of the following: an environmental condition and a triggering event.

20. The system of claim 14, further comprising an antenna associated with the electronic data tag, and wherein the means for decommissioning comprises one or more of the following: disabling the antenna, disconnecting the antenna, and disabling circuitry in the electronic data tag.

21. The system of claim 14, further comprising fire suppression means for preventing or extinguishing a fire resulting from operation of the means for decommissioning or the means for modifying.

22. The system of claim 14, further comprising:
means for identifying a type of the electronic data tag;
means for selecting an action based on a set of decommissioning rules and as a function of the type identified by the means for identifying; and
means for performing the action selected by the means for selecting.

23. The system of claim 22, further comprising means for detecting a frequency range of the electronic data tag, and wherein the means for decommissioning the electronic data tag associated with the article received by the means for receiving comprises means for decommissioning the electronic data tag as a function of the detected frequency range.

24. The system of claim 14, wherein the means for decommissioning the electronic data tag associated with the article received by the means for receiving comprises means for applying radio frequency energy to the electronic data tag to decommission the electronic data tag.

* * * * *